US011940749B2

(12) United States Patent
Yamaguchi

(10) Patent No.: US 11,940,749 B2
(45) Date of Patent: Mar. 26, 2024

(54) FIXING DEVICE AND IMAGE FORMING APPARATUS INCORPORATING SAME WITH A REFLECTOR THAT DOES NOT CONTACT A STAY

(71) Applicant: Yoshiki Yamaguchi, Kanagawa (JP)

(72) Inventor: Yoshiki Yamaguchi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 17/989,716

(22) Filed: Nov. 18, 2022

(65) Prior Publication Data

US 2023/0229104 A1 Jul. 20, 2023

(30) Foreign Application Priority Data

Jan. 20, 2022 (JP) ................................ 2022-007144

(51) Int. Cl.
*G03G 15/20* (2006.01)

(52) U.S. Cl.
CPC ..... *G03G 15/2053* (2013.01); *G03G 15/2017* (2013.01); *G03G 15/2064* (2013.01); *G03G 2215/2032* (2013.01); *G03G 2215/2035* (2013.01)

(58) Field of Classification Search
CPC ........... G03G 15/2017; G03G 15/2053; G03G 15/2064; G03G 2215/2035
USPC .......................................... 399/329; 219/216
See application file for complete search history.

(56) References Cited

U.S. PATENT DOCUMENTS 9,746,804 B1 * 8/2017 Ichiki ................. G03G 15/2053
2011/0085832 A1 * 4/2011 Hasegawa .......... G03G 15/2032 399/329
2013/0279955 A1 * 10/2013 Maeda ............... G03G 15/2053 399/329
2015/0063883 A1 * 3/2015 Nakano ............. G03G 15/2053 399/329
2015/0293482 A1 * 10/2015 Takahashi .......... G03G 15/2053 399/329
2017/0176898 A1 * 6/2017 Izawa ................ G03G 15/2042
(Continued)

FOREIGN PATENT DOCUMENTS

EP 3690553 A1 * 8/2020 ......... G03G 15/2053
JP 2015-045713 3/2015
(Continued)

*Primary Examiner* — Robert B Beatty
(74) *Attorney, Agent, or Firm* — XSENSUS LLP

(57) ABSTRACT

A fixing device includes a fixing rotator, a pressure rotator, a heater inside the fixing rotator, a reflector, and a sliding member. The pressure rotator is in contact with the fixing rotator to form a nip and presses a recording medium passing through the nip. The reflector includes a reflecting portion that reflects radiant heat radiated by the heater toward an inner circumferential surface of the fixing rotator and a pressure receiving portion that receives a pressing force of the pressure rotator via the fixing rotator. The pressure receiving portion is thermally coupled to the reflecting portion. The sliding member is between the pressure receiving portion and the fixing rotator and in contact with the pressure receiving portion and the fixing rotator. With respect to the inner circumferential surface of the fixing rotator, the sliding member has a smaller friction coefficient than a surface of the pressure receiving portion.

17 Claims, 4 Drawing Sheets

(56) References Cited

U.S. PATENT DOCUMENTS

| | | | | |
|---|---|---|---|---|
| 2017/0248881 | A1* | 8/2017 | Suzuki ............... | G03G 15/2028 |
| 2020/0387094 | A1 | 12/2020 | Yamaguchi et al. | |
| 2020/0409292 | A1 | 12/2020 | Fujimoto et al. | |
| 2021/0191301 | A1 | 6/2021 | Fujimoto et al. | |
| 2022/0291613 | A1 | 9/2022 | Yamaguchi et al. | |

FOREIGN PATENT DOCUMENTS

| | | | | |
|---|---|---|---|---|
| JP | 2015-194633 | | | 11/2015 |
| JP | 2015194633 | A | * | 11/2015 |
| JP | 2018-169467 | | | 11/2018 |
| JP | 2019-015943 | | | 1/2019 |

* cited by examiner

FIXING DEVICE AND IMAGE FORMING APPARATUS INCORPORATING SAME WITH A REFLECTOR THAT DOES NOT CONTACT A STAY

CROSS-REFERENCE TO RELATED APPLICATION

This patent application is based on and claims priority pursuant to 35 U.S.C. § 119(a) to Japanese Patent Application No. 2022-007144, filed on Jan. 20, 2022, in the Japan Patent Office, the entire disclosure of which is hereby incorporated by reference herein.

BACKGROUND

Technical Field

Embodiments of the present disclosure generally relate to a fixing device and an image forming apparatus incorporating the fixing device.

Related Art

One type of image forming apparatus includes a fixing device. The fixing device includes a fixing rotator, a pressure rotator, a heater, and a reflector. The pressure rotator is in contact with the outer circumferential surface of the fixing rotator to form a nip through which a recording medium passes. The heater and the reflector are disposed inside a loop of the fixing rotator. The heater radiates radiant heat, and the reflector reflects the radiant heat to the inner circumferential surface of the fixing rotator.

SUMMARY

This specification describes an improved fixing device that includes a fixing rotator, a pressure rotator, a heater, a reflector, and a sliding member. The pressure rotator is in contact with an outer circumferential surface of the fixing rotator to form a nip and presses a recording medium passing through the nip. The heater is disposed inside a loop of the fixing rotator. The reflector includes a reflecting portion and a pressure receiving portion. The reflecting portion reflects radiant heat radiated by the heater toward an inner circumferential surface of the fixing rotator. The pressure receiving portion receives a pressing force of the pressure rotator via the fixing rotator. The pressure receiving portion is thermally coupled to the reflecting portion. The sliding member is between the pressure receiving portion and the inner circumferential surface of the fixing rotator and in contact with the pressure receiving portion and the inner circumferential surface of the fixing rotator. The sliding member has a sliding surface on which the inner circumferential surface of the fixing rotator slides, and the sliding surface has a smaller friction coefficient than a friction coefficient of a surface of the pressure receiving portion with respect to the inner circumferential surface of the fixing rotator.

This specification also describes an improved fixing device that includes a fixing rotator, a pressure rotator, a heater, a reflector, and a heat transfer member. The pressure rotator is in contact with an outer circumferential surface of the fixing rotator to form a nip and presses a recording medium passing through the nip. The heater is disposed inside a loop of the fixing rotator. The reflector includes a reflecting portion and a pressure receiving portion. The reflecting portion reflects radiant heat radiated by the heater toward an inner circumferential surface of the fixing rotator. The pressure receiving portion receives a pressing force of the pressure rotator via the fixing rotator. The pressure receiving portion is thermally coupled to the reflecting portion. The heat transfer member is between the pressure receiving portion and the inner circumferential surface of the fixing rotator and in contact with the pressure receiving portion and the inner circumferential surface of the fixing rotator. The heat transfer member has a high thermal conductivity.

This specification further describes an improved fixing device that includes a fixing rotator, a thermal equalizer, a pressure rotator, a stay, a heater, and a reflector. The thermal equalizer is in contact with an inner circumferential surface of the fixing rotator to uniform a temperature distribution in a rotation axis direction of the fixing rotator. The pressure rotator presses the thermal equalizer via the fixing rotator to form a nip and presses a recording medium passing through the nip. The stay receives a pressing force of the pressure rotator via the thermal equalizer. The heater is disposed inside a loop of the fixing rotator. The reflector reflects radiant heat radiated by the heater toward an inner circumferential surface of the fixing rotator. The reflector extends to a region between the thermal equalizer and a region on the stay in which the stay receives the pressing force from the pressure rotator via the thermal equalizer.

This specification still further describes an image forming apparatus including any one of the fixing devices.

BRIEF DESCRIPTION OF THE DRAWINGS

A more complete appreciation of the disclosure and many of the attendant advantages and features thereof can be readily obtained and understood from the following detailed description with reference to the accompanying drawings, wherein.

Figure 1:
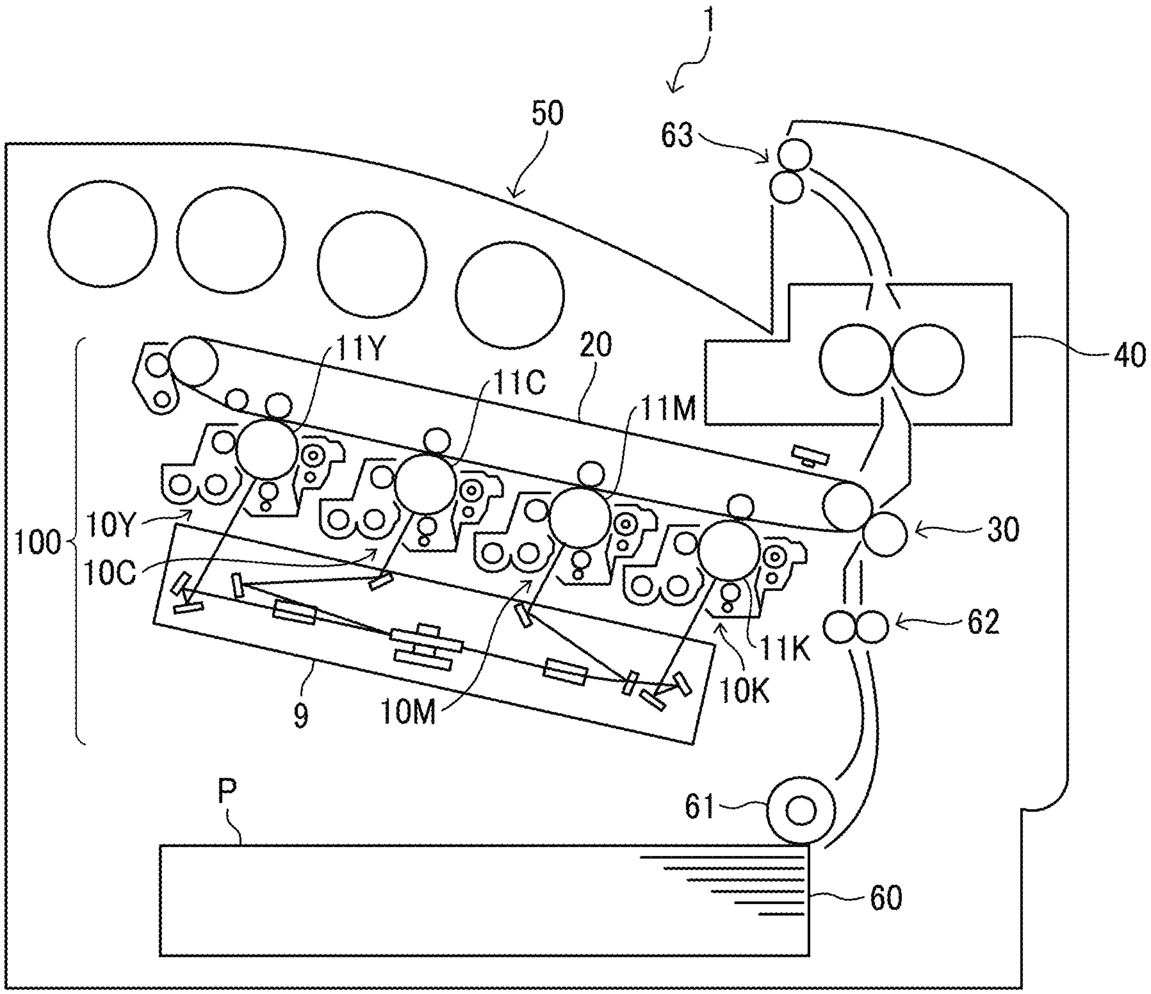
FIG. 1 is a schematic cross-sectional view of an image forming apparatus according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms "a," "an," and "the" are intended to include the plural forms as well, unless the context clearly indicates otherwise.

Referring to the attached drawings, the following describes embodiments of the present disclosure. In the drawings for illustrating embodiments of the present disclosure, identical reference numerals are assigned to elements such as members and parts that have an identical function or an identical shape as long as differentiation is possible, and descriptions of such elements may be omitted once the description is provided.

A laser printer is described below as an electrophotographic image forming apparatus according to one embodiment of this disclosure. FIG. 1 is a schematic cross-sectional view of an image forming apparatus 1 according to the present embodiment of the present disclosure. The image forming apparatus 1 includes an image forming section 100 to form an image on a sheet P as a recording medium. The image forming apparatus 1 is a tandem-type image forming apparatus. The image forming section 100 includes image forming devices 10Y, 10M, 10C, and 10K for respective colors of yellow (Y), magenta (M), cyan (C), and black (K) and an intermediate transfer belt 20 as an intermediate transferor. The image forming devices 10Y, 10M, 10C, and 10K are arranged along a rotation direction of the intermediate transfer belt 20 on the intermediate transfer belt 20. The image forming devices 10Y, 10M, 10C, and 10K include photoconductors 11Y, 11M, 11C, and 11K as latent image bearers, respectively.

Each of the image forming devices 10Y, 10M, 10C, and 10K includes a charging device as a Charger, an optical writing device 9 as an electrostatic-latent-image forming device, and a developing device around each of the photoconductors 11Y, 11M, 11C, and 11K. In addition, each of the image forming devices 10Y 10M, 10C, and 10K includes a primary transfer device as a primary transferor and a cleaning device as a cleaner around each of the photoconductors 11Y, 11M, 11C, and 11K. The charging device uniformly charges the surface of the photoconductor to a predetermined potential. The optical writing device 9 irradiates the surface of the photoconductor uniformly charged by the charging device with light based on image data to form an electrostatic latent image. The developing devices develop the electrostatic latent images on the photoconductors to form toner images of toners of respective colors (yellow, magenta, cyan, and black), respectively, which is referred to as a developing process. The primary transfer device transfers the toner image on the photoconductor onto the intermediate transfer belt 20. The cleaning device removes residual toner that is not transferred onto the intermediate transfer belt and remains on the photoconductor to clean the surface of the photoconductor.

The primary transfer devices primarily transfer color toner images formed on the photoconductors 11Y, 11M, 11C, and 11K onto the intermediate transfer belt 20 to superimpose the color toner images on the intermediate transfer belt 20, forming a four-color toner image on the intermediate transfer belt 20. Rotation of the intermediate transfer belt 20 conveys the four-color toner image on the intermediate transfer belt 20 to a secondary transfer area in which the four-color toner image faces a secondary transfer device 30.

The image forming apparatus includes a sheet tray 60 below the image forming section 100. The sheet tray 60 holds sheets P and serves as a feeding section for feeding the sheet P. A pickup roller 61 feeds the sheets P one by one from the sheet tray 60 to a conveyance path. A registration roller pair 62 conveys the sheet P to the secondary transfer area along the conveyance path.

The registration roller pair 62 conveys the sheet P to the secondary transfer area at a predetermined timing at which the four-color toner image on the intermediate transfer belt 20 reaches the secondary transfer area, and the secondary transfer device 30 secondarily transfer the four-color toner image from the intermediate transfer belt 20 onto the sheet P. The sheet P on which the color toner image is formed is then conveyed to a fixing device 40, and the fixing device 40 applies heat and pressure to the sheet P to fix the four-color toner image onto the sheet P. After the four-color toner image is fixed onto the sheet P, the sheet P is conveyed along the conveyance path, and an output roller pair 63 ejects the sheet P to an output tray 50.

Figure 2:
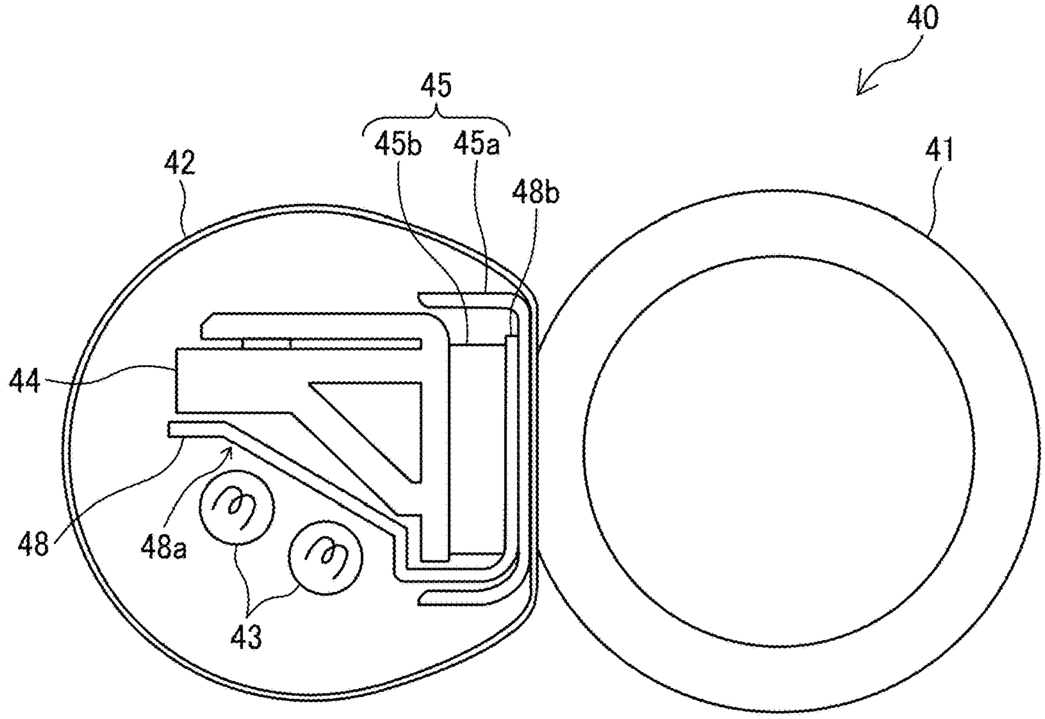
FIG. 2 is a schematic cross-sectional view of a fixing device incorporated in the image forming apparatus of FIG. 1.

FIG. 2 is a schematic cross-sectional view of the fixing device 40 according to the present embodiment.

The fixing device 40 includes a pressure roller 41 serving as a pressure rotator, a fixing belt 42 serving as a fixing rotator, and heaters 43 that are, for example, halogen heaters as illustrated in FIG. 2 to apply the heat and pressure to the sheet P and fix the toner image onto the sheet P.

The fixing device 40 includes a stay 44 and a nip formation pad 45 held by the stay 44 that are disposed inside a loop of the fixing belt 42.

The nip formation pad 45 includes a thermal equalizer 45*a* and a resin-pad 45*b*. The thermal equalizer 45*a* faces a nip surface and serves as a heat transfer member and a sliding member. The resin-pad 45*b* supports the thermal equalizer 45*a*. One of the functions of the resin-pad 45*b* is thermal insulation to reduce heat transferred from the fixing belt 42 to the stay 44 via the nip formation pad 45 and prevent warm-up time and a Typical Electricity Consumption (TEC) value from increasing. The thermal equalizer 45*a* has, for example, a pad shape extending in a width direction of the fixing belt 42. The thermal equalizer 45*a* is disposed to equalize the temperature distribution in the fixing belt in an axial direction. The thermal equalizer 45*a* transfers heat from a high temperature portion of the fixing belt 42 to a low temperature portion of the fixing belt 42 to equalize the temperature distribution in the fixing belt in the axial direction.

In FIG. 2, the nip has a flat shape but may have a concave shape or other shapes. The nip having the concave shape causes the direction in which the leading end of the sheet P is ejected from the nip to be the direction toward the pressure roller, which improves separation of the sheet P from the fixing belt 42 and prevents the occurrence of a sheet jam.

The thermal equalizer 45*a* is made of metal such as aluminum or copper and has a high thermal conductivity of 50 W/m·K or more, and the surface of the thermal equalizer 45*a* is coated with a coating having an excellent sliding property. Examples of the material for the coating include resin-based materials such as polyimide resin, fluororesin, polyphenylene sulfide resin, and saturated polyester resin. The above-described resin-based coating material may be mixed with glass fiber, carbon, graphite, graphite fluoride, carbon fiber, molybdenum disulfide, fluororesin, or the like.

Alternatively, metal-based coating material may be used. Examples of the metal-based coating material include molybdenum disulfide, nickel, and composite plating of nickel and fluorine resin, in addition, the metal-based coating material may be alumite or alumite impregnated with a resin or a metal. Ceramics may also be used as the coating material. Examples of the ceramic used as the coating material include silicon carbide ceramic, silicon nitride ceramic, alumina ceramic, and mixtures thereof with molybdenum disulfide, fluorine resin, and the like.

Alternatively, forming an alumite layer on the surface layer of the thermal equalizer 45*a* made of aluminum or aluminum alloys and filling the fine pores of the alumite layer with molybdenum disulfide generated by secondary electrolysis from the deepest portions of the fine pores to the outermost surface layer forms the excellent coating. The thermal equalizer 45*a* having a high thermal conductivity in the present embodiment is made of a material having a thermal-conductivity equal to or higher than the thermal conductivity of aluminum and is processed as described above. Thus, the thermal equalizer having the high thermal conductivity is produced.

The pressure roller 41 includes a metal roller, a silicone rubber layer on the outer circumferential surface of the metal roller, and a release layer on the outer circumferential surface of the silicone layer. The release layer is made of perfluoroalkoxy alkane (PFA) polytetrafluoroethylene (PTFE) to obtain releasability. A spring or the like presses the pressure roller 41 against the fixing belt 42 to deform the silicone rubber layer. As a result, the nip has a predetermined nip width.

A driver such as a motor is disposed in the image forming apparatus and transmits driving force to the pressure roller 41 through gears to rotate the pressure roller 41. The pressure roller 41 transmits the driving force to the fixing belt 42 at the nip to rotate the fixing belt 42.

The pressure roller 41 may be a solid roller but is preferably hollow because the hollow roller has a small thermal capacity. In a case in which the pressure roller 41 is a hollow roller, a heater such as a halogen heater may be disposed inside the hollow roller. The silicone rubber layer of the pressure roller 41 may be made of solid rubber. Alternatively, if no heater is situated inside the pressure roller 41, the silicone rubber layer of the pressure roller 41 may be made of sponge rubber. The sponge rubber is preferable to the solid rubber because the sponge rubber has enhanced thermal insulation that draws less heat from the fixing belt 42.

The fixing belt 42 is an endless belt or film and includes a base layer made of a metal material, such as nickel or steel use stainless (SUS), or a resin material, such as polyimide. The surface layer of the fixing belt 42 has a release layer. The release layer is made of perfluoroalkoxy alkane (PEA), polytetrafluoroethylene (PTFE), or the like to facilitate separation of toner of the toner image on the sheet P from the fixing belt 42, thus preventing the toner of the toner image from adhering to the fixing belt 42.

An elastic layer made of, e.g., silicone rubber may be interposed between the base layer and the release layer in the fixing belt 42. Omitting the elastic layer made of silicone rubber reduces thermal capacity and enhances fixability. However, the slight surface roughness of the fixing belt 42 may be transferred onto a recording medium while a toner image is fixed onto the recording medium, causing an orange-peel image, which is an image having uneven gloss in a solid part of the image. To address this circumstance, the elastic layer made of silicone rubber has a thickness not smaller than 100 micrometers. Deformation of the elastic layer made of silicone rubber absorbs the slight surface roughness of the fixing belt 42, preventing formation of the orange-peel image.

The stay 44 is a hollow pipe-shaped metal body made of metal such as aluminum, iron, or stainless steel. In the present embodiment, the stay 44 has a rectangular shape but may have another cross-sectional shape. The stay 44 prevents betiding of the nip formation pad 45 that receives pressure from the pressure roller 41 and uniformly forms the nip width in the axial direction of the pressure roller 41.

Two heaters 43 are disposed inside the loop of the fixing belt 42 to raise the temperature of the fixing belt 42. The heaters 43 in the present embodiment are halogen heaters and directly heat the inner circumferential surface of the fixing belt 42 with radiant heat. As long as the heater 43 can heat the fixing belt 42, the heater 43 may be one of various types of heaters such as a beater including an induction heating (IH) coil, a resistive heat generator, or a carbon heater.

The fixing device 40 includes a reflector 48 inside the loop of the fixing belt 42. The reflector 48 reflects the radiant heat from the heaters 43 to the fixing belt 42 to reduce loss of the radiant heat. The reflector 48 is made of a high-luminance aluminum or the like. The high-luminance aluminum includes a base made of a high-purity aluminum material as a metal, and the base has a surface layer including a plurality of reflection enhancing films and protective films to obtain a high reflectance that is, for example, 95% or more. Depending on the configuration, silver may be deposited on an aluminum plate by vapor deposition to further improve the reflectance.

The reflector 48 according to the present embodiment includes a reflecting portion 48*a* and a pressure receiving portion 48*b*. The reflecting portion 48*a* reflects the radiant heat toward the fixing belt 42. The pressure receiving portion 48*b* receives the pressure from the pressure roller 41. The reflecting portion 48*a* is disposed between the heaters 43 and the stay 44. The pressure receiving portion 48*b* is interposed between the thermal equalizer 45*a* as the sliding member and the resin-pad 45*b*.

Figure 3:
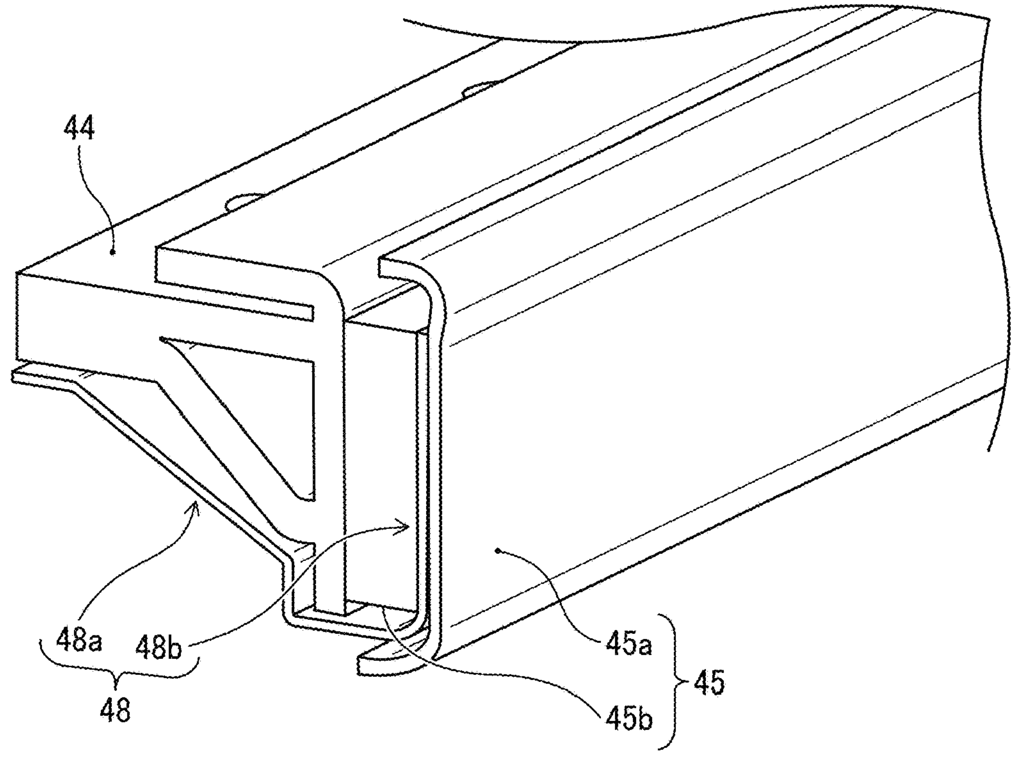
FIG. 3 is a partial perspective view of a reflector, a nip formation pad, and a stay that are assembled.

FIG. 3 is a partial perspective view of the reflector 48, the nip formation pad 45, and the stay 44 that are assembled.

Figure 6:
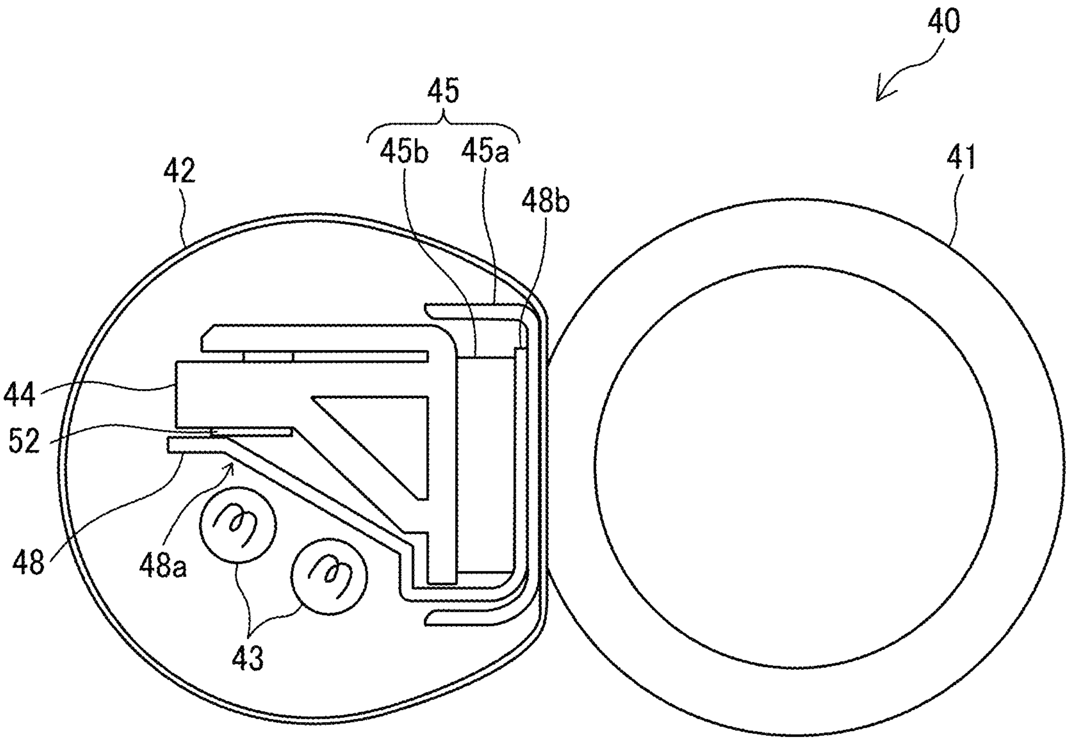
FIG. 6 is a schematic cross-sectional view of a fixing device according to another variation of the present disclosure.

As illustrated in FIG. 3, the pressure receiving portion 48*b* of the reflector 48 is held by being sandwiched between the thermal equalizer 45*a* and the resin-pad 45*b*, and a portion other than the pressure receiving portion 48*b* in the reflector 48 is not in contact with a member around the reflector 48. Instead of the configuration illustrated in FIG. 3, the reflector 48 may be in contact with the stay via a heat insulating material 52 as illustrated in FIG. 6. The above-described configuration stabilizes the position of the reflector 48.

Figure 4:
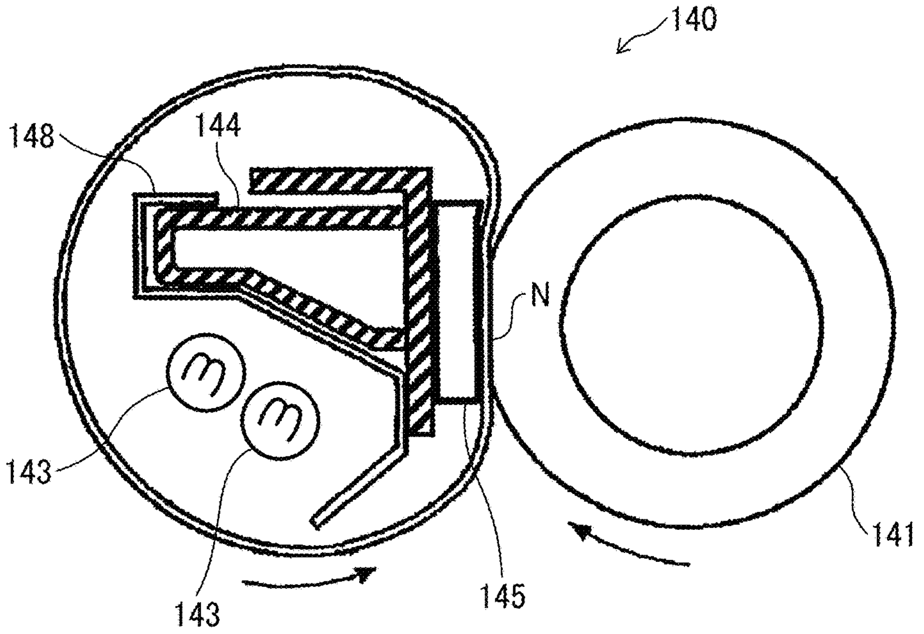
FIG. 4 is a schematic cross-sectional view of a fixing device according to a comparative embodiment.

FIG. 4 is a schematic cross-sectional view of a fixing device according to a comparative embodiment.

As illustrated in FIG. 4, a reflector 148 in the fixing device according to the comparative embodiment does not include the pressure receiving portion 48*b*.

The reflector 148 has a reflectance of about 95 to 98% and cannot reflect 100% of the radiant heat of a heater 143. The reflector 148 itself slightly absorbs the radiant heat. As a result, the temperature of the reflector 148 gradually increases. In particular, continuously fixing a large number of toner images onto a large number of sheets in the fixing device according to the comparative embodiment illustrated in FIG. 4 increases the temperature of the reflector 148 to about 300° C. to 400° C. Applying a certain heat load or more to the reflector 148 causes tarnish of the aluminum or silver layer of the reflector 148. The tarnish decreases the reflectance of the reflector 148 and deteriorates the performance of the reflector 148. In the worst case, the tarnish may affect the safety of the fixing device. To avoid the above-described disadvantages, the productivity of the fixing device according to the comparative embodiment is limited so that the certain heat load is not applied to the reflector 148. In other words, the fixing device according to the comparative embodiment creates a bottleneck in improving productivity of the image forming apparatus.

In contrast, the reflector 48 in the present embodiment includes the pressure receiving portion 48*b* extending to a region between the thermal equalizer 45*a* and the resin-pad 45*b*, and the region receives the pressure from pressure roller 41 as described with reference to FIGS. 2 and 3. Since the reflector 48 is made of metal having good thermal conductivity such as aluminum as described above, heat absorbed in the reflecting portion 48*a*, quickly transmits to the entire reflector 48. The heat of the reflector 48 transfers from the pressure receiving portion 48*b* to the thermal equalizer 45*a* because the pressure receiving portion 48*b* is in contact with the thermal equalizer 45*a*, preventing temperature increase in the reflector 48. After the heat of the reflector 48 transfers the thermal equalizer 45*a*, the heat transfers from the thermal equalizer 45*a* to the fixing belt 42 and is used for melting toner. As a result, the above-described configuration can more effectively use the heat of the reflector 48 than a configuration in which another member such as the stay 44 dissipates the heat of the reflector 48. As a result, the above-described configuration can shorten a lighting time of the heater 43 and reduce power consumption.

The pressure receiving portion 48*b* is located in a pressure region that receives the pressure from the pressure roller 41. The pressure causes the thermal equalizer 45*a* to be in close contact with the pressure receiving portion 48*b* to improve heat transfer performance. As a result, the pressure receiving portion 48*b* can effectively dissipate the heat of the reflector 48. In addition, the thermal equalizer 45*a* and the reflector 48 made of metal having good thermal conductivity can effectively dissipate the heat of the reflector 48 to the fixing belt 42.

As illustrated in FIGS. 2 and 3, a clearance is formed between the reflector 48 and a bent portion of the thermal equalizer 45*a*, and a clearance is formed between the reflector 48 and the stay 44, As a result, the reflector 48 is not in contact with the bent portion of the thermal equalizer 45*a* and the stay 44. The above-described configuration can prevent heat transfer from the reflector 48 to the bent portion of the thermal equalizer 45*a* and the stay 44. The above-described heat transfer is unnecessary in terms of effective use of heat.

The above-described configuration enables the fixing device to prevent the temperature increase in the reflector 48, effectively use heat of the reflector 48, and reduce power consumption.

Since the thermal equalizer 45*a* is coated with the above-described coating having the excellent sliding property, the friction coefficient of the thermal equalizer 45*a* with respect to the inner circumferential surface of the fixing belt 42 is smaller than the friction coefficient of the surface of the pressure receiving portion 48*b* with respect to the inner circumferential surface of the fixing belt 42. Thus, the sliding resistance of the fixing belt can be reduced as compared with a case in which the pressure receiving portion 48*b* of the reflector 48 is brought into contact with the inner circumferential surface of the fixing belt 42 to dissipate the heat of the reflector 48 to the fixing belt 42 without passing through the thermal equalizer 45*a*. The above-described configuration prevents an increase in torque for rotating the fixing belt 42 and abrasion of the inner peripheral surface of the fixing belt 42.

If the pressure receiving portion 48*b* of the reflector 48 is coated with the coating having the excellent sliding property to be in contact with the inner circumferential surface of the fixing belt 42, the following disadvantage may be expected. That is, the reflectance of the reflecting portion 48*a* may decrease if the coating material having the excellent sliding property adheres to the reflecting portion 48*a* of the reflector 48. To avoid adhesion of the coating material having the excellent sliding property to the reflecting portion 48*a*, for example, it is necessary to apply masking or the like to the reflecting portion 48*a*. Applying the masking to the reflecting portion 48*a* needs processes such as a process to apply the masking, a process to remove the masking, a process to remove an adhesive for masking adhered to the reflection portion 48*a*. It is very difficult for a machine to perform these processes. If the machine that perform these processes can be made, the machine will be expensive.

In contrast, transmitting the heat of the reflector 48 to the fixing belt 42 via the thermal equalizer 45*a* does not need the excellent slidability of the reflector 48 with respect to the inner circumferential surface of the fixing belt 42. Accordingly, it is not necessary to apply the coating having the excellent sliding property to the pressure receiving portion 48*b*, which prevents manufacturing difficulty and an increase in cost.

Figure 5:
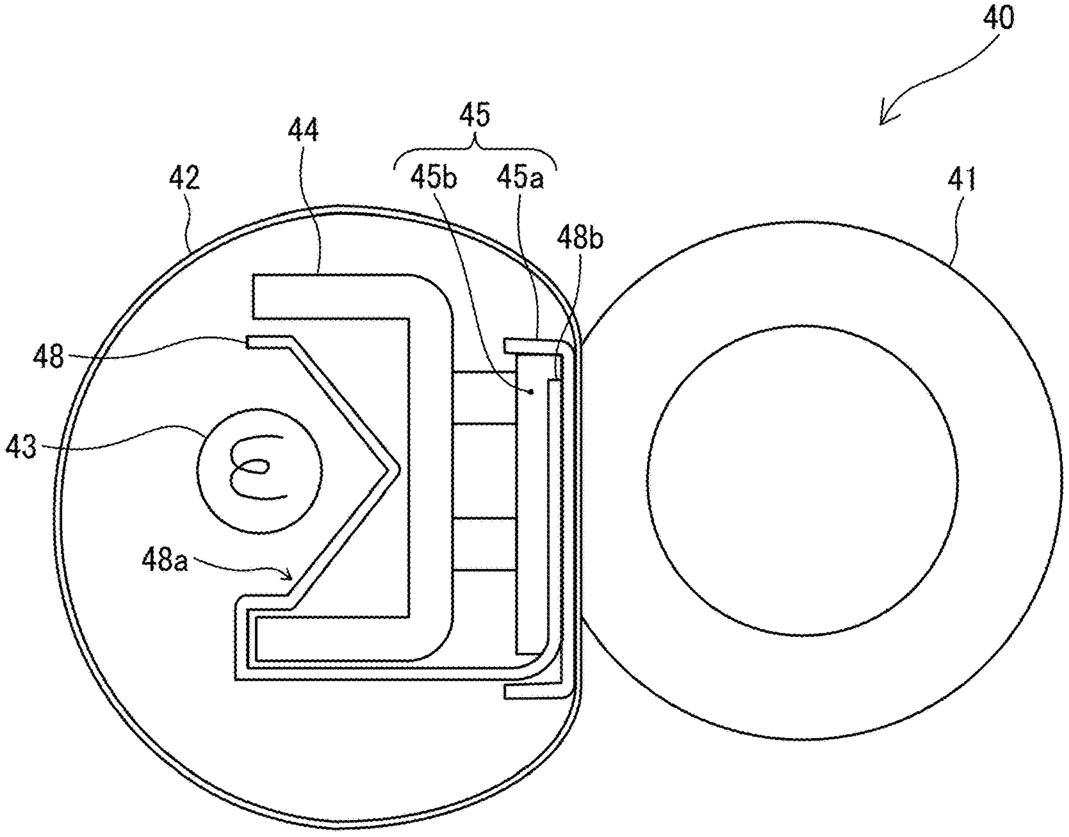
FIG. 5 is a schematic cross-sectional view of a fixing device according to a variation of the present disclosure.

FIG. 5 is a schematic cross-sectional view of a fixing device according to a variation of the present disclosure.

The fixing device 40 illustrated in FIG. 5 includes the stay 44 having a concave shape in the cross-sectional view viewed in a direction of an imaginary rotation axis formed by rotation of the fixing belt 42 that is referred to as a rotation axis direction. The fixing device 40 includes the heater 43 disposed in the concave portion of the stay 44. Similar to the above embodiment, the reflecting portion 48*a* of the reflector 48 is disposed between the stay 44 and the heater 43. The reflector 48 includes the pressure receiving portion 48*b* that extends from a lower end of the reflecting portion 48*a* in FIG. 5 and is sandwiched between the resin-pad 45*b* and the thermal equalizer 45*a*.

In the fixing device illustrated in FIG. 5, the heat of the reflector 48 can be dissipated to the fixing belt 42 via the thermal equalizer 45*a* to melt the toner.

In the above description, the thermal equalizer 45*a* is disposed between the pressure receiving portion 48*b* of the reflector 48 and the fixing belt 42. However, a member disposed between the pressure receiving portion 48*b* and the fixing belt 42 may be a member having a better sliding property with respect to the inner circumferential surface of the fixing belt 42 than the reflector. For example, although a property to dissipate the heat to the fixing belt 42 is inferior to a property of the thermal equalizer 45*a*, a sliding sheet as the sliding member may be disposed between the pressure receiving portion 48*b* and the fixing belt 42. The sliding sheet is made of fibers such as PTFE impregnated with a lubricant such as silicone oil. The sliding sheet is, for example, disposed so as to be wound around the resin-pad 45*b* and fixed by a screw or the like on a back side of the resin-pad 45*b*, the back side facing the stay 44.

The configurations according to the above-descried embodiment and the variation are examples, and embodiments of the present disclosure are not limited to the above. For example, the following aspects can achieve effects described below.

First Aspect

In a first aspect, a fixing device includes a fixing rotator such as the fixing belt 42, a pressure rotator such as the pressure roller 41, a heater such as the heater 43, a reflector such as the reflector 48, and a sliding member such as the thermal equalizer 45*a*. The pressure rotator is in contact with the outer circumferential surface of the fixing rotator to form the nip and presses the recording medium passing through the nip. The heater is disposed inside a loop of the fixing rotator. The reflector includes a reflecting portion such as the reflecting portion 48*a* and a pressure receiving portion such as the pressure receiving portion 48*b*. The reflecting portion reflects radiant heat radiated by the heater toward the inner circumferential surface of the fixing rotator. The pressure receiving portion receives a pressing force of the pressure rotator via the fixing rotator and is thermally coupled to the reflecting portion. The sliding member is between the pressure receiving portion and the inner circumferential surface of the fixing rotator and in contact with the pressure receiving portion and the inner circumferential surface of the fixing rotator. The sliding member has a higher slidability with respect to the inner circumferential surface of the fixing rotator than a slidability of the surface of the pressure receiving portion with respect to the inner circumferential surface of the fixing rotator.

Another structure different from the structure of the first aspect may be considered. For example, the pressure receiving portion of the reflector such as the reflector 48 may be in contact with the inner circumferential surface of the fixing rotator to transfer the heat from the reflector to the fixing rotator. However, the inner circumferential surface of the fixing rotator rotates and slides on the pressure receiving portion. The above-described structure increases a sliding resistance between the fixing rotator and the pressure receiving portion of the reflector. As a result, the above-described structure causes a disadvantage that is a large rotational torque for rotating the fixing rotator.

In contrast, since the fixing device according to the first aspect includes the sliding member such as the thermal equalizer 45*a* between the pressure receiving portion 48*b* and the fixing rotator such as the fixing belt 42, the rotational torque for rotating the fixing rotator can be reduced to be smaller than the rotational torque for rotating the fixing rotator having the inner circumferential surface in contact with the pressure receiving portion 48*b* of the reflector. In addition, since the heat of the reflector transfers from the reflector to the fixing rotator via the sliding member that is in close contact with the pressure receiving portion by the pressing force of the pressure rotator, the fixing device according to the first aspect can prevent the temperature decrease of the fixing rotator.

Second Aspect

In a second aspect, the fixing device according to the first aspect includes the sliding member such as the thermal equalizer 45*a* having a friction coefficient of a sliding surface on which the inner circumferential surface of the fixing rotator slides that is smaller than a friction coefficient of a surface of the pressure receiving portion of the reflector such as the reflector 48 with respect to the inner circumferential surface of the fixing rotator.

As described in the embodiment, the above-described structure can reduce the sliding resistance of the fixing rotator to be smaller than the sliding resistance of the fixing rotator such as the fixing belt 42 having the inner circumferential surface in contact with the pressure receiving portion 48*b* of the reflector such as the reflector 48. As a result, the above-described structure can prevent the rotational torque for rotating the fixing rotator from increasing and reduce wear of the inner circumferential surface of the fixing rotator.

Third Aspect

In a third aspect, the sliding member such as the thermal equalizer 45*a* in the fixing device according to the first aspect or the second aspect is made of metal.

As described in the embodiment, the above-described structure can efficiently transfer the heat of the reflector such as the reflector 48 from the pressure receiving portion 48*b* to the fixing rotator such as the fixing belt 42.

Fourth Aspect

In a fourth aspect, the reflector such as the reflector 48 in the fixing device according to the first aspect to the third aspect is made of metal.

As described in the embodiment, the reflector such as the reflector 48 absorbs the radiant heat from the heaters 43, but the reflector made of metal can quickly transfer the heat to the pressure receiving portion 48*b*, which improves the heat dissipation performance of the reflector.

Fifth Aspect

In a fifth aspect, a fixing device includes a fixing rotator such as the fixing belt 42, a pressure rotator such as the pressure roller 41, a heater such as the heater 43, a reflector such as the reflector 48, and a heat transfer member such as the thermal equalizer 45*a*. The pressure rotator is in contact with the outer circumferential surface of the fixing rotator to form the nip and presses the recording medium passing through the nip. The heater is disposed inside a loop of the fixing rotator. The reflector includes a reflecting portion such as the reflecting portion 48*a* and a pressure receiving portion such as the pressure receiving portion 48*b*. The reflecting portion reflects radiant heat radiated by the heater toward the inner circumferential surface of the fixing rotator. The pressure receiving portion receives a pressing force of the pressure rotator via the fixing rotator and is thermally coupled to the reflecting portion. The heat transfer member is between the pressure receiving portion and the inner circumferential surface of the fixing rotator, is in contact with the pressure receiving portion and the inner circumferential surface of the fixing rotator, and has a high thermal conductivity.

As described in the embodiment, the above-described structure can efficiently transfer the heat of the reflector such as the reflector 48 from the pressure receiving portion 48*b* to the fixing rotator such as the fixing belt 42. In addition, the heat transfer member can transfer heat from a portion having a large amount of heat (that is, the portion having a high temperature) in the rotation axis direction of the fixing rotator to a portion having a small amount of heat (that is, the portion having a low temperature) in the rotation axis direction to uniform the temperature distribution of the fixing rotator in the rotation axis direction. In addition, coating the surface of the heat transfer member in contact with the inner circumferential surface of the fixing rotator with a low-friction material can reduce the rotational torque for rotating the fixing rotator. As a result, the rotational torque for rotating the fixing rotator can be reduced at low cost to be smaller than a rotational torque for rotating the fixing rotator having the inner circumferential surface in direct contact with the pressure receiving portion of the reflector.

Sixth Aspect

In a sixth aspect, a friction coefficient of a contact surface of the heat transfer member in the fixing device according to the fifth aspect such as the thermal equalizer 45*a* on which the inner circumferential surface of the fixing rotator such as the fixing belt 42 slides is smaller than a friction coefficient of a surface of the pressure receiving portion such as the pressure receiving portion 48*b* with respect to the inner circumferential surface of the fixing rotator.

According to the sixth aspect, as described in the embodiment, the rotational torque for rotating the fixing rotator can be reduced at low cost.

Seventh Aspect

In a seventh aspect, a portion other than the pressure receiving portion such as the pressure receiving portion 48*b* in the reflector such as the reflector 48 of the fixing device according to any one of the first aspect to the sixth aspect is not in contact with a member around the reflector.

The configuration according to the seventh aspect can prevent the radiant heat radiated by the heater such as the heater 43 and absorbed by the reflector such as the reflector 48 from transferring to the member other than the fixing rotator such as the fixing belt 42. As a result, the radiant heat absorbed by the reflector can be effectively used for fixing the toner to the recording medium.

Eighth Aspect

In an eighth aspect, a fixing device includes a fixing rotator such as the fixing belt 42, a thermal equalizer such as the thermal equalizer 45*a*, a pressure rotator such as the pressure roller 41, a stay such as the stay 44, a heater such as the heater 43 and a reflector such as the reflector 48. The thermal equalizer is in contact with an inner circumferential surface of the fixing rotator to uniform a temperature distribution in the rotation axis direction of the fixing rotator. The pressure rotator presses the thermal equalizer via the fixing rotator to form a nip and presses a recording medium passing through the nip. The stay receives a pressing force of the pressure rotator via the thermal equalizer. The heater is disposed inside a loop of the fixing rotator. The reflector reflects radiant heat radiated by the heater toward an inner circumferential surface of the fixing rotator. The reflector extends to a region between the thermal equalizer and a region on the stay in which the stay receives a pressing force from the pressure rotator via the thermal equalizer.

According to the eighth aspect, the pressing force of the pressure rotator can favorably bring the thermal equalizer and the reflector into close contact with each other, which improves heat transfer performance. As a result, the heat of the reflector can favorably transfer to the fixing rotator via the thermal equalizer, which prevents temperature rise in the reflector and enables using the heat of the reflector to heat the fixing rotator. The above-described configuration can more effectively use the heat of the reflector 48 than a configuration in which another member such as the stay 44 dissipates the heat of the reflector 48. As a result, the above-described configuration can shorten a lighting time of the heater 43 and reduce power consumption. In addition, the above-described configuration can reduce the rotational torque for rotating the fixing rotator to be smaller than the rotational torque for rotating the fixing rotator in direct contact with the reflector.

Ninth Aspect

In a ninth aspect, an image forming apparatus includes an image forming section to form an image on a recording medium and the fixing device according to any one of the first aspect to the eighth aspect to fix the image onto the recording medium.

The image forming image forming apparatus according to the ninth aspect can prevent the temperature rise of the reflector, effectively use unnecessary heat, and reduce power consumption.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

What is claimed is:

1. A fixing device comprising:

a fixing rotator;

a pressure rotator being in contact with an outer circumferential surface of the fixing rotator to form a nip, the pressure rotator to press a recording medium passing through the nip;

a heater disposed inside a loop of the fixing rotator, a stay to receive a pressing force of the pressure rotator;

a reflector not in contact with the stay, the reflector including:

a reflecting portion to reflect radiant heat radiated by the heater toward an inner circumferential surface of the fixing rotator; and a pressure receiver to receive a pressing force of the pressure rotator via the fixing rotator, the pressure receiver being thermally coupled to the reflecting portion; and a slide between the pressure receiver and the inner circumferential surface of the fixing rotator, the slide in contact with the pressure receiver and the inner circumferential surface of the fixing rotator, the slide having a sliding surface on which the inner circumferential surface of the fixing rotator slides, the sliding surface having a smaller friction coefficient than a friction coefficient of a surface of the pressure receiver with respect to the inner circumferential surface of the fixing rotator.

2. The fixing device according to claim 1, wherein the slide includes metal.

3. The fixing device according to claim 1, wherein the reflector includes metal.

4. An image forming apparatus comprising:

an image forming section to form an image on a recording medium; and the fixing device according to claim 1, to fix the image onto the recording medium.

5. A fixing device comprising:

a fixing rotator;

a pressure rotator being in contact with an outer circumferential surface of the fixing rotator to form a nip, the pressure rotator to press a recording medium passing through the nip;

a heater disposed inside a loop of the fixing rotator, a stay to receive a pressing force of the pressure rotator;

a reflector not in contact with the stay, the reflector including:

a reflecting portion to reflect radiant heat radiated by the heater toward an inner circumferential surface of the fixing rotator; and a pressure receiver to receive a pressing force of the pressure rotator via the fixing rotator, the pressure receiver being thermally coupled to the reflecting portion; and a heat transferer between the pressure receiver and the inner circumferential surface of the fixing rotator, the heat transferer in contact with the pressure receiver and the inner circumferential surface of the fixing rotator, the heat transferer having a high thermal conductivity.

6. The fixing device according to claim 5, wherein a friction coefficient of a contact surface of the heat transferer on which the inner circumferential surface of the fixing rotator slides is smaller than a friction coefficient of a surface of the pressure receiver with respect to the inner circumferential surface of the fixing rotator.

7. The fixing device according to claim 5, wherein the reflector includes metal.

8. An image forming apparatus comprising:
an image forming section to form an image on a recording medium; and
the fixing device according to claim 5, to fix the image onto the recording medium.

9. A fixing device comprising:
a fixing rotator;
a thermal equalizer being in contact with an inner circumferential surface of the fixing rotator to uniform a temperature distribution in a rotation axis direction of the fixing rotator;
a pressure rotator to press the thermal equalizer via the fixing rotator to form a nip and press a recording medium passing through the nip;
a stay to receive a pressing force of the pressure rotator via the thermal equalizer;
a heater disposed inside a loop of the fixing rotator; and
a reflector to reflect radiant heat radiated by the heater toward the inner circumferential surface of the fixing rotator, the reflector extending to a region between the thermal equalizer and a region on the stay in which the stay receives the pressing force from the pressure rotator via the thermal equalizer,
the reflector is not in contact with the stay.

10. The fixing device according to claim 9, wherein the reflector includes metal.

11. An image forming apparatus comprising:
an image forming section to form an image on a recording medium; and
the fixing device according to claim 9, to fix the image onto the recording medium.

12. A fixing device comprising:
a fixing rotator;
a pressure rotator being in contact with an outer circumferential surface of the fixing rotator to form a nip, the pressure rotator to press a recording medium passing through the nip;
a heater disposed inside a loop of the fixing rotator,
a reflector including:
a reflecting portion to reflect radiant heat radiated by the heater toward an inner circumferential surface of the fixing rotator; and
a pressure receiver to receive a pressing force of the pressure rotator via the fixing rotator, the pressure receiver being thermally coupled to the reflecting portion; and
a slide between the pressure receiver and the inner circumferential surface of the fixing rotator, the slide in contact with the pressure receiver and the inner circumferential surface of the fixing rotator, the slide having a sliding surface on which the inner circumferential surface of the fixing rotator slides, the sliding surface having a smaller friction coefficient than a friction coefficient of a surface of the pressure receiver with respect to the inner circumferential surface of the fixing rotator,
wherein the only part of the reflector that is in contact with the slide is the pressure receiver.

13. An image forming apparatus comprising:
an image forming section to form an image on a recording medium; and
the fixing device according to claim 12, to fix the image onto the recording medium.

14. A fixing device comprising:
a fixing rotator;
a pressure rotator being in contact with an outer circumferential surface of the fixing rotator to form a nip, the pressure rotator to press a recording medium passing through the nip;
a heater disposed inside a loop of the fixing rotator,
a reflector including:
a reflecting portion to reflect radiant heat radiated by the heater toward an inner circumferential surface of the fixing rotator; and
a pressure receiver to receive a pressing force of the pressure rotator via the fixing rotator, the pressure receiver being thermally coupled to the reflecting portion; and
a heat transferer between the pressure receiver and the inner circumferential surface of the fixing rotator, the heat transferer in contact with the pressure receiver and the inner circumferential surface of the fixing rotator, the heat transferer having a high thermal conductivity,
wherein the only part of the reflector that is in contact with the heat transferer is the pressure receiver.

15. An image forming apparatus comprising:
an image forming section to form an image on a recording medium; and
the fixing device according to claim 14, to fix the image onto the recording medium.

16. A fixing device comprising:
a fixing rotator;
a thermal equalizer being in contact with an inner circumferential surface of the fixing rotator to uniform a temperature distribution in a rotation axis direction of the fixing rotator;
a pressure rotator to press the thermal equalizer via the fixing rotator to form a nip and press a recording medium passing through the nip;
a stay to receive a pressing force of the pressure rotator via the thermal equalizer;
a heater disposed inside a loop of the fixing rotator; and
a reflector to reflect radiant heat radiated by the heater toward the inner circumferential surface of the fixing rotator, the reflector extending to a region between the thermal equalizer and a region on the stay in which the stay receives the pressing force from the pressure rotator via the thermal equalizer, the reflector including a pressure receiver to receive a pressing force of the pressure rotator via the fixing rotator, the pressure receiver being thermally coupled to a reflecting portion of the reflector,
wherein the only part of the reflector that is in contact with the thermal equalizer is the pressure receiver.

17. An image forming apparatus comprising:
an image forming section to form an image on a recording medium; and
the fixing device according to claim 16, to fix the image onto the recording medium.

* * * * *